Sept. 27, 1927.
A. MARLAND
1,643,929
MANUAL HOLDER FOR ARC WELDING ELECTRODES
Filed Sept. 29, 1925
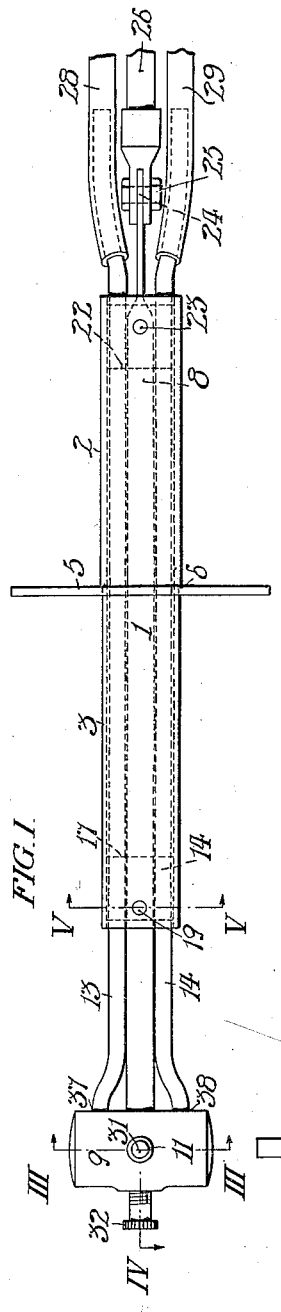
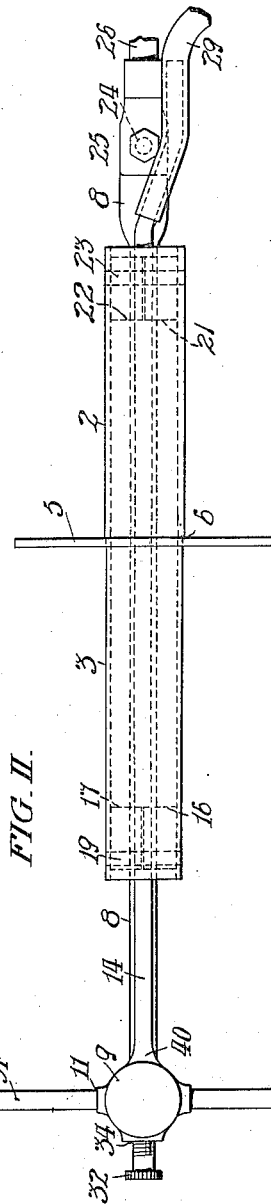
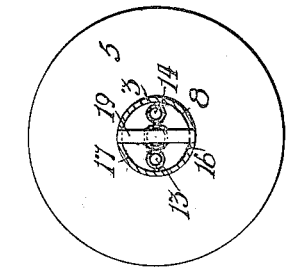
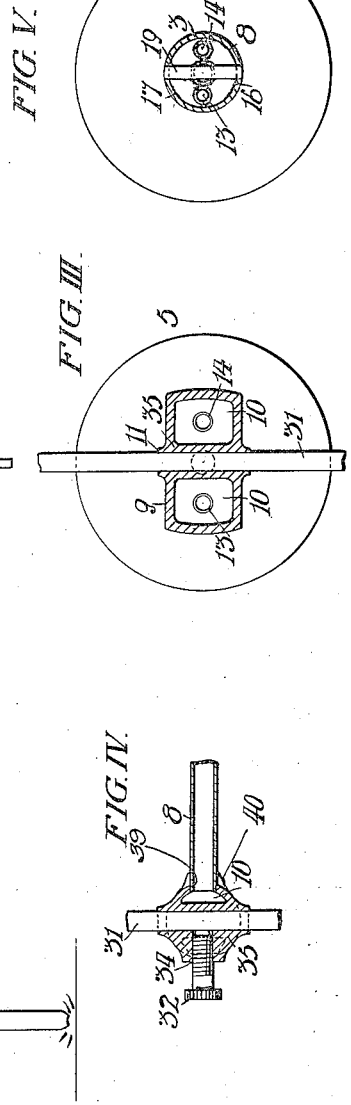
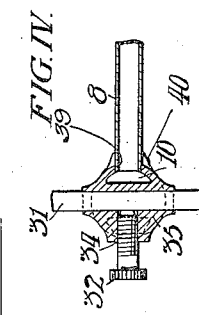
INVENTOR:
ARTHUR MARLAND, Patented Sept. 27, 1927.

1,643,929

UNITED STATES PATENT OFFICE.

ARTHUR MARLAND, OF CONSHOHOCKEN, PENNSYLVANIA, ASSIGNOR TO JOHN WOOD MANUFACTURING COMPANY, OF CONSHOHOCKEN, PENNSYLVANIA, A CORPORATION OF PENNSYLVANIA.

MANUAL HOLDER FOR ARC WELDING ELECTRODES.

Application filed September 29, 1925. Serial No. 59,257.

My invention relates to a device which is used as a terminal of an electric arc welding circuit, to detachably carry the electrode which the welding operator must manipulate with respect to the work to be welded, and is particularly adapted for holding carbon electrodes, as distinguished from metallic electrodes which are fused in the arc to deposit metal therefrom upon the work. However, the device hereinafter described may be used to hold such metallic electrodes.

Holders for such electrodes must be firmly grasped by the operator to manipulate the same with the accuracy required for the welding operation. Ordinarily, holders for the purpose above contemplated are formed of solid metallic parts extending through and from a handle formed of insulating material. Such devices are objectionable in that the metal parts become so hot during a short period of use that it is impossible for the operator to continue to retain his grasp thereof and, consequently, the operation of welding must be stopped until the heat has dissipated from the holder to such a degree that the operator may resume his grasp thereof. Of course, a single operator may be provided with a plurality of such ordinary holders to be used in succession with only such interruption of the work as is necessary to disconnect one holder and connect another with a source of electrical energy. In any event, there is a loss of time in the welding operation imposed by the use of such ordinary holders and, of course, the provision of a plurality of holders and means for connecting and disconnecting them for the use of a single operator adds to the cost of the welding operation.

Therefore, it is the object and effect of my invention to provide a holder which may be continuously used and maintained at such temperature that the operator may firmly grasp it without discomfort. As hereinafter described, my invention includes a tubular handle of insulating material which contains, in addition to the electrical conductor leading therethrough to the electrode holder, a pair of pipes through which water or other refrigerant material may be circulated in communication with a chamber in the electrode holder surrounding the electrode.

My invention includes the various novel features of construction and arrangement hereinafter more definitely specified.

In said drawings; Fig. I is a plan view of a holder conveniently embodying my invention.

Fig. II is a side elevation of said holder with an electrode clamped therein.

Fig. III is a transverse sectional view of said holder, taken on the line III, III in Fig. I.

Fig. IV is a fragmentary longitudinal sectional view of said holder, taken on the line IV in Fig. I.

Fig. V is a transverse sectional view of said holder, taken on the line V, V in Fig. I.

In said figures; the handle 1 is formed of a tube of insulating, and preferably refractory, material, which is thickest at the region 2 which is intended to be grasped but is reduced in thickness at the region 3 so that a disk of similar insulating, and preferably refractory, material 5 may be forced over said handle portion 3 against the annular shoulder 6 to serve as a shield for the hand of the operator.

Said handle tube 1 contains the electrical conductor 8, in coaxial relation therewith and in electrical connection with the electrode holder 9. Said holder 9 is a hollow body having the chamber 10 for refrigerant surrounding the electrode socket 11 and in communication with the two pipes 13 and 14 which extend through said handle tube in diametrically opposite relation upon opposite sides of said conductor 8. Said conductor 8 and pipes 13 and 14 are held in the assembled position shown between opposed substantially semicircular plugs 16 and 17, which are held in the front end of said handle tube 1 by the pin of insulating material 19 which is driven through them and through said conductor, which latter is conveniently formed of a copper tube, and the rear end of said handle tube 1 is similarly provided with plugs 21 and 22 held therein by the insulating pin 23 driven through said plugs and the conductor 8.

Said pipes 13 and 14 are bent at their rear ends to afford access to the rear end of said conductor 8 which is collapsed to plane form and provided with a hole 24 to receive a bolt 25 for electrically connecting said conductor with a flexible cable 26 leading to the source of energy. Said pipes 13 and 14 are respectively connected with flexible conduits 28 and 29 through which the refrigerant is circulated, by any convenient means. When water is used as a refrigerant, the conduit 28 may be directly connected to a supply tap and the conduit 29 extended to a drain.

Although electrodes, such as indicated at 31 in Fig. II may be detachably secured in the holder 9 by any convenient means; I prefer to fit them in slidable relation with the socket 11 and to clamp them in adjusted position therein by means of the set screw 32 which is in screw threaded engagement in the hole 34 extending through the web 35 which extends radially across said chamber 10 and preferably in unitary relation with the side walls of said holder 9 which, as indicated, is conveniently formed of a brass casting having drilled holes 37 and 38 in which the ends of the pipes 13 and 14 are fitted. Said conductor 8 may be similarly fitted in the hole 39 and said pipes and conductor may be permanently rigidly connected with said holder 9 by coating 40 of brazing composition. Said composition 40 may be conveniently applied by dipping the assembled parts in a molten bath thereof.

However, I do not desire to limit myself to the precise details of construction and arrangement herein set forth, as it is obvious that various modifications may be made therein without departing from the essential features of my invention, as defined in the appended claims.

I claim:

1. In a manual holder for an arc welding electrode, the combination with a metallic socket for such electrode; of means forming a chamber for refrigerant extending upon opposite sides of said socket and means arranged for circulating a refrigerant fluid through said chamber, including separate pipes connected with said chamber upon respectively opposite sides of said socket.

2. In a manual holder for an arc welding electrode, the combination with a metallic socket for such electrode; of means forming a chamber for refrigerant adjoining said socket and means arranged for circulating a refrigerant fluid through said chamber, including two pipes extending rigidly from said socket, transversely to its axis, and forming a handle for said holder.

3. In a manual holder for an arc welding electrode, the combination with a metallic socket for such electrode; of means forming a chamber for refrigerant adjoining said socket and means arranged for circulating a refrigerant fluid through said chamber, including two pipes forming a handle for said holder; said pipes extending in parallel relation, for a portion of their length; a handle tube of insulating material surrounding said pipes at their parallel portions; and means rigidly connecting said handle tube and pipes in spaced relation, including plugs fitted in the opposite ends of said tube.

4. In a manual holder for an arc welding electrode, the combination with a metallic socket for such electrode; of means forming a chamber for refrigerant adjoining said socket and means arranged for circulating a refrigerant fluid through said chamber, including two pipes forming a handle for said holder; said pipes extending in parallel relation, for a portion of their length; a handle tube of insulating material surrounding said pipes at their parallel portions; and means rigidly connecting said handle tube and pipes in spaced relation, including plugs fitted in the opposite ends of said tube; and an electric conductor rigidly connected at its front end, with said electrode holder, extending through said handle tube, and provided, at its rear end, with means for detachable connection with an electric cable.

5. In a manual holder for arc welding electrodes; the combination with a handle formed of a tube of insulating material; of a rigid electrical conductor extending through said handle tube, and having, at its rear end, means for detachable engagement with a flexible electrical conductor; an electrode holder, electrically connected with said conductor at the front end thereof, and comprising a hollow body having an internal chamber for refrigereant surrounding an electrode socket extending therethrough; two pipes rigidly connected at the front ends with said holder, in communication with said chamber, and extending through said handle tube and adapted for connection with flexible conduits at the rear of said handle tube; and means securing said conductor and pipes in spaced relation in said handle; and means arranged to detachably secure an electrode in axially adjustable relation with said socket.

6. In a manual holder for an arc welding electrode; the combination with a socket for an electrode; of means arranged to cool said socket, including refrigerant conduits extending to and from said socket, in rigid relation therewith; and a tubular handle of insulating material encircling both of said conduits.

In testimony whereof, I have hereunto signed my name at Conshohocken, Pennsylvania, this twenty-fourth day of September, 1925.

ARTHUR MARLAND.